Figure 1:
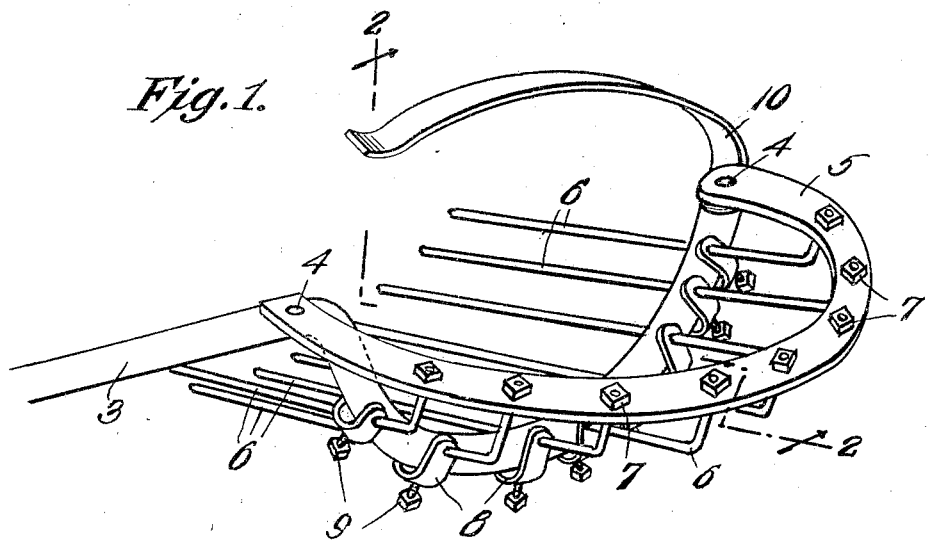

D. A. HAAS.
SHOCK HOLDER.
APPLICATION FILED AUG. 28, 1917.

1,343,624.

Patented June 15, 1920.

WITNESSES
James F. Crown

INVENTOR
Daniel A. Haas,
By Richard B. Owen.
ATTORNEY

UNITED STATES PATENT OFFICE.

DANIEL A. HAAS, OF BELLEVILLE, ILLINOIS.

SHOCK-HOLDER.

1,343,624.   Specification of Letters Patent.   Patented June 15, 1920.

Application filed August 28, 1917. Serial No. 188,621.

*To all whom it may concern:*

Be it known that I, DANIEL A. HAAS, a citizen of United States, residing at Belleville, in the county of St. Clair and State of Illinois, have invented certain new and useful Improvements in Shock-Holders, of which the following is a specification.

This invention relates to shock holders for use in connection with agricultural machinery, and is adapted particularly to be used with a shocking apparatus such as that disclosed in my Patent Number 1,272,426, patented July 16, 1918.

The primary object of the invention is to provide an improved holder for the bundles delivered from the binder, so that the said bundles will be firmly held in position to provide a shock of proper size and shape.

A further object of the invention is to provide a holder of the character set forth which shall be of simple and inexpensive construction, which has its various parts so constructed and assembled as to minimize the opportunity for wear or breakage, which insures the bundles against becoming accidentally lost from the holder, and which will prove thoroughly efficient in practice.

With these objects in view, together with others which will appear as the description proceeds, the invention resides in the novel formation, combination and arrangement of parts, all as will be described more fully hereinafter, illustrated in the drawings, and particularly pointed out in the claims.

In the drawings:—

Figure 2:
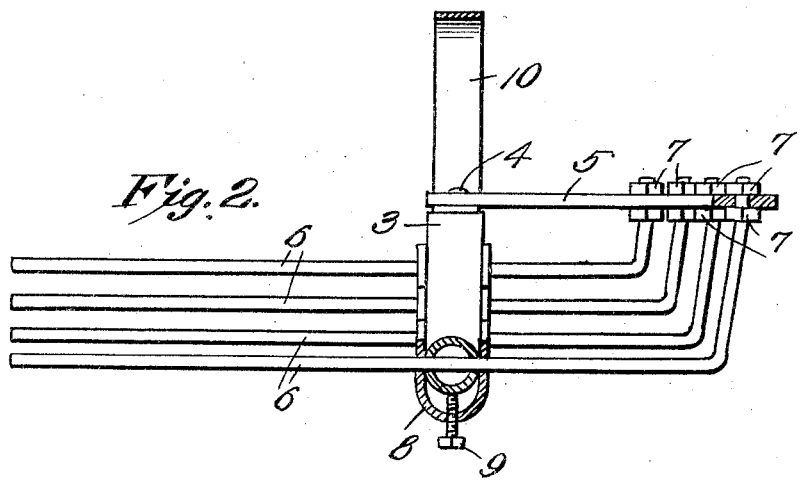

Figure 1 is a perspective view, of a shock holder constructed in accordance with the invention, and Fig. 2 is a sectional view taken substantially upon line 2—2 of Fig. 1.

Referring now particularly to the drawings, the bundle holding bar is indicated at 3, and may be formed of any approved material and may be of any desirable size. This bar in the present instance is formed of metal and is round in cross section. The bar at its outer end is bent downwardly into substantially semi-circular shape, the free end of the said bar being disposed in same plane with the straight portion of the said bar.

Connected at its extremities as by bolts or rivets 4 to the bar 3 is an arcuate strap member 5, the said strap member projecting rearwardly from the said bar adjacent the arcuate portion of the latter. It will be observed, particularly with reference to Fig. 2 of the drawing, that the strap member 5 is disposed at right angles to the arcuate portion of the bar 3.

The tines which are adapted to receive and support the bundle delivered from the binder are indicated at 6, and comprise relatively long rods of small diameter, the said rods being straight for the greater portion of their lengths. These rods are bent upwardly at their rear ends, and extend through suitable apertures arranged in spaced relation upon the strap member 5. Lock nuts 7 are threaded upon the rear ends of the said tines, so as to hold the latter firmly to the strap member 5. The straight portions of the tines extend through suitable openings arranged in the arcuate portion of the bar 3, and project forwardly from the latter. To firmly hold the tines to the arcuate portion of the bar 3 a plurality of yokes 8 are provided. These yokes straddle the bar 3, and are provided with openings through which the tines 6 project. The bight portions of the yokes are provided with set screws 9 which bear against the bar 3, and it is obvious that tightening of these screws will cause the tines to be firmly held within the openings in said bar.

In operation, the bundles discharged from the binder are placed within the basket with their butt ends extending forwardly. As the basket becomes filled it will hold the bundles firmly in place, and the shock thus formed may be removed from the basket in any approved manner. The bar 3 may then be normally inclined so that sheaves dropped from the binder will be collected and retained by the holder.

From the foregoing it is obvious that I have provided a bundle holder which is of extremely simple construction, and which will prove thoroughly efficient in the attainment of the ends for which it is designed.

While the present is a disclosure of the preferred embodiment of the invention, it is to be understood that the invention is not limited thereto, as various changes in the minor details of construction, proportion, and arrangement of parts may be resorted to if desired without departing from the spirit of the invention as defined by the appended claims.

What I claim is:—

1. In a shock holder, a bar having a downwardly extending portion at one end, a strap member secured at its ends to said bar and extending rearwardly therefrom adjacent said downwardly extending portion, a plurality of tines secured at their rear ends to said strap member, lock nuts holding said tines rigidly to said member, the downwardly extending portion of said bar being provided with spaced apertures to receive said tines, yokes straddling said bar and being engaged with said tines, and a set screw on each yoke engaging said bar.

2. In a shock holder, a bar having a downwardly extending portion at one end, a strap member secured at its ends to said bar and extending rearwardly therefrom adjacent the said downwardly extending portion, a plurality of tines secured at their rear ends to said strap member, the downwardly extending portion of said bar being provided with spaced apertures to receive said tines, yokes straddling said bar and being engaged with said tines, and a set screw on each yoke engaging said bar.

3. In a shock holder, a bar having a downwardly extending portion at one end, a strap member secured at its ends to said bar and extending rearwardly therefrom adjacent said downwardly extending portion, a plurality of tines secured at their rear ends to said strap member, the downwardly extending portion of said bar being provided with spaced apertures to receive said tines, yokes straddling said bar and being engaged with said tines, and means for bearing upon said bar to retract the yokes slightly and bind the tines upon said bar.

In testimony whereof I affix my signature in presence of two witnesses.

DANIEL A. HAAS.

Witnesses:
BEATRICE MANN,
WM. H. PFINGSTEN.